United States Patent
Reatherford et al.

(10) Patent No.: US 7,357,338 B1
(45) Date of Patent: Apr. 15, 2008

(54) GASEOUS FUEL INJECTOR

(75) Inventors: Larry Reatherford, Clarkston, MI (US); Carl Johnson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/559,823

(22) Filed: Nov. 14, 2006

(51) Int. Cl.
*F02M 51/00* (2006.01)

(52) U.S. Cl. ............... 239/585.5; 239/533.11; 239/585.1; 239/585.4; 239/600

(58) Field of Classification Search ........ 239/584, 239/585.1, 585.4, 585.5, 600, 533.11; 251/129.15
See application file for complete search history.

(56) References Cited

U.S. PATENT DOCUMENTS

| | | | |
|---|---|---|---|
| 3,773,265 A | * | 11/1973 | Kent ............ 239/585.4 |
| 5,192,048 A | * | 3/1993 | Wakeman ........ 251/129.15 |
| 5,797,425 A | | 8/1998 | Carter et al. |
| 6,412,713 B2 | | 7/2002 | Okajima et al. |
| 6,431,469 B2 | | 8/2002 | Lambert et al. |
| 6,523,565 B2 | | 2/2003 | Girouard |
| 6,584,958 B2 | | 7/2003 | Rahardja et al. |
| 6,938,839 B2 | | 9/2005 | Xu et al. |

* cited by examiner

*Primary Examiner*—Steven J. Ganey
(74) *Attorney, Agent, or Firm*—Allan J. Lippa; Alleman Hall McCoy Russell & Tuttle LLP

(57) ABSTRACT

A fuel injector. The fuel injector includes a fuel channel configured to receive pressurized gaseous fuel from a fuel rail, and a nozzle in fluid communication with the fuel channel. The fuel injector also includes a pintle having an opened position and a closed position, wherein pressurized gaseous fuel is delivered from the nozzle when the pintle is in the opened position and wherein introduction of the pressurized gaseous fuel is substantially blocked when the pintle is in the closed position. A support aligns the pintle with the nozzle. A pintle controller is configured to selectively move the pintle between the closed position and the opened position.

16 Claims, 2 Drawing Sheets

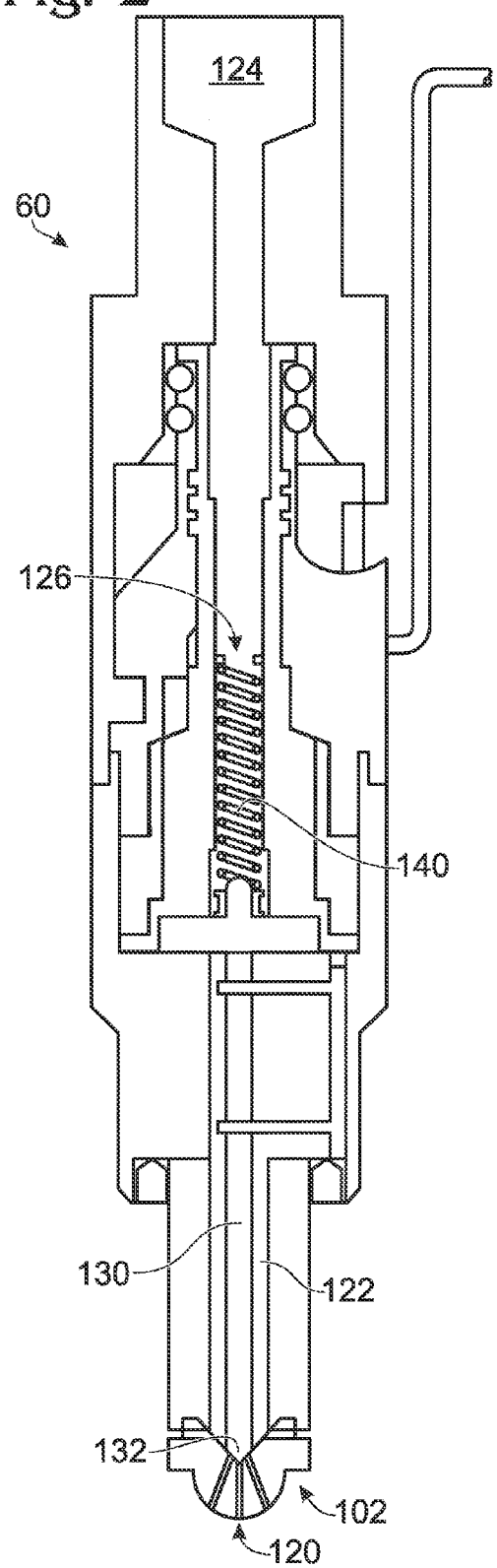
Fig. 2
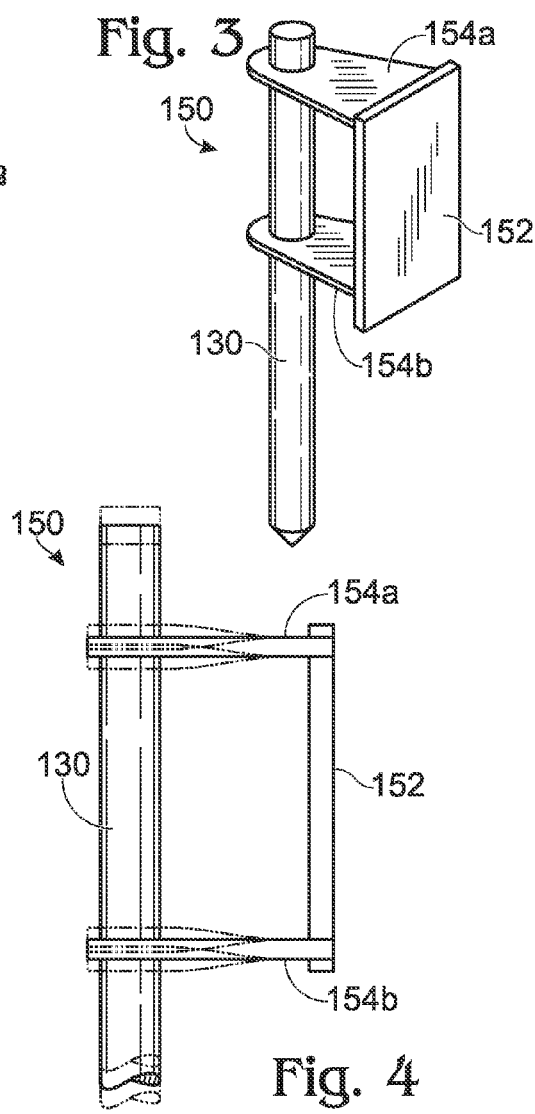
Fig. 3
Fig. 4
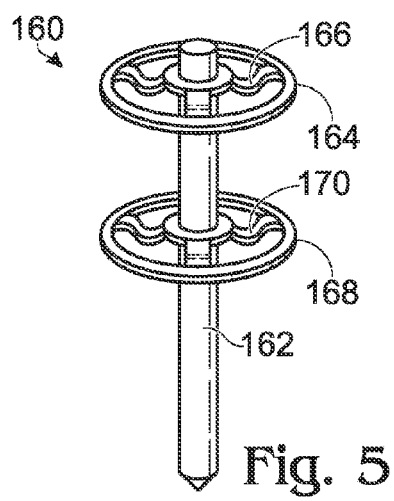
Fig. 5

GASEOUS FUEL INJECTOR

BACKGROUND AND SUMMARY

Internal combustion engines convert chemical energy in a fuel to mechanical energy. As part of the conversion, the fuel can be combusted, thus causing hot combustion products to expand within the engine. The expansion of the combustion products can be used to move mechanical components of the engine, such as pistons. Combustion reactions can have several products, or emissions, some of which can be undesirable. For example, when hydrocarbons are used as fuel, combustion products can include HC, CO, $CO_2$ and $NO_x$.

In an attempt to reduce emissions, efforts have been made to utilize substantially carbon-free hydrogen as a combustion fuel instead of hydrocarbons. When hydrogen ($H_2$) is used as the fuel, there is not a substantial amount of HC, CO, or $CO_2$ emissions, because the fuel does not include carbon that can be turned into HC, CO, or $CO_2$. Therefore, hydrogen fuel is currently viewed as a good fuel choice for environmentally clean engines.

The inventor herein has recognized that it can be difficult to achieve a desired air-to-fuel ratio when hydrogen is used as a combustion fuel. In particular, it can be difficult to introduce enough air into the cylinder relative to the amount of fuel in the cylinder. Unlike more conventional liquid fuels, hydrogen gas can occupy a significant volume within a cylinder, thus limiting the volume available for air at a given pressure.

Others have attempted to address this problem by using direct cylinder fuel injection so that a full charge of air can be introduced to a cylinder and effectively trapped within the cylinder before hydrogen is injected. In this manner, the cylinder contains a full charge of air, and the injected hydrogen simply increases the pressure within the cylinder. Thus far, direct hydrogen fuel injectors have evolved from existing injectors designed to inject other fuels, such as natural gas or propane.

The inventor herein has recognized that the design and material selection for various components in hydrogen fuel injectors are inadequate for hydrogen fuel applications. Using such injectors, it is believed that internal failures such as seizing, galling, and leakage can cause rough running and misfiring in as little as five hours of operation. As an example, the bearings that are used to align the pintle in more conventional fuel injectors may not be adequately lubricated in a hydrogen fuel injector because the gaseous fuel does not lubricate the bearings in the same manner a liquid fuel lubricates the bearings. The bearings can wear prematurely due to a lack of lubrication, thus causing pintle misalignments, which in turn can cause the tip of the pintle to prematurely wear. This can cause undesired leaks.

At least some of the issues associated with hydrogen fuel injection may be addressed by a fuel injector including a cantilever support for aligning the pintle with the fuel injector nozzle. In this manner, pintle alignment and sealing capacity can be improved and/or prolonged.

BRIEF DESCRIPTION OF THE DRAWINGS

FIG. 2 shows a cross section view of a hydrogen fuel injector.

FIG. 3 shows an exemplary pintle assembly including parallel supports.

FIG. 4 shows the pintle of FIG. 3 as it is opened and closed.

FIG. 5 shows an exemplary pintle assembly including ring-shaped parallel supports.

DETAILED DESCRIPTION

Figure 1:
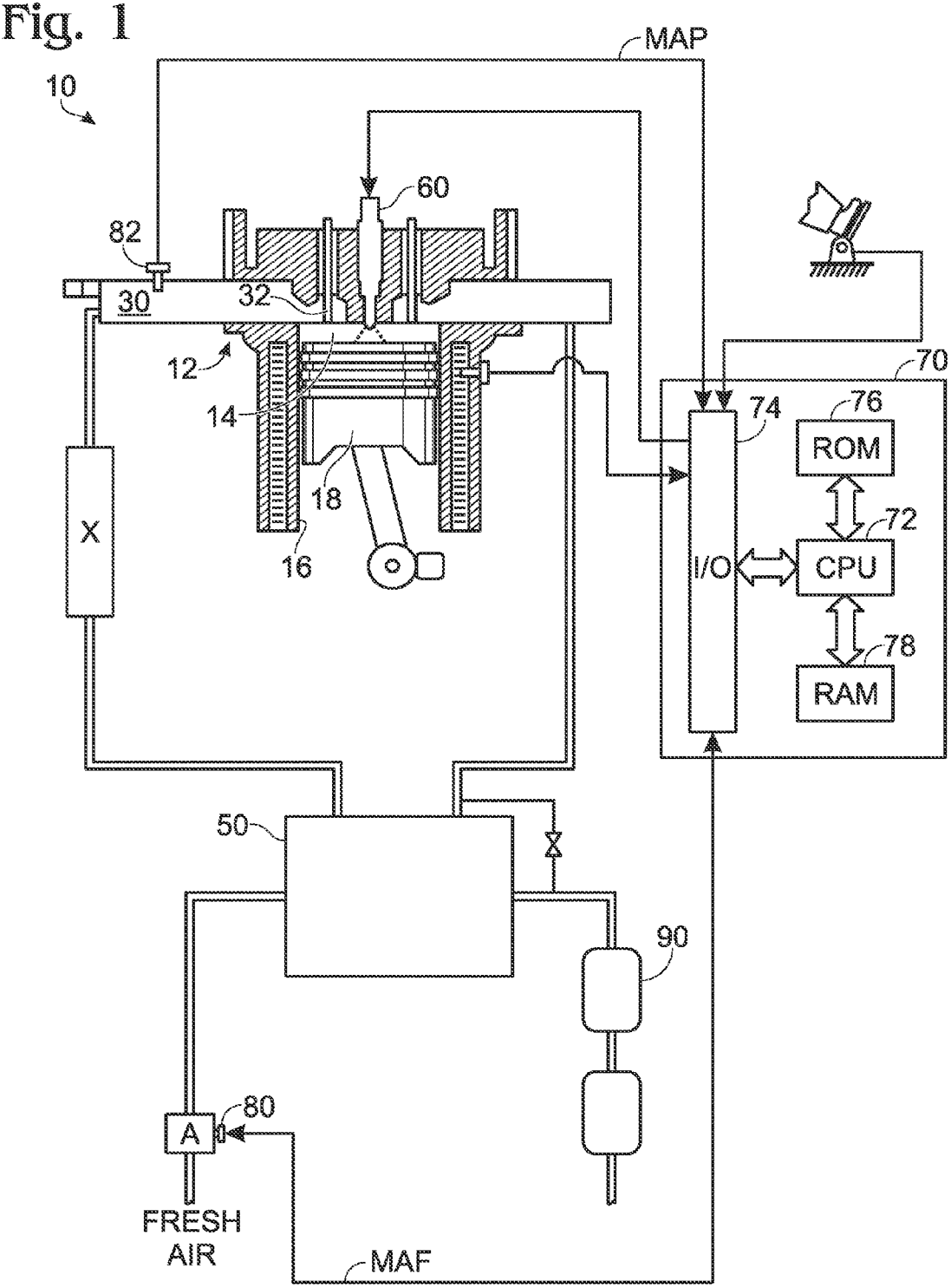
FIG. 1 schematically shows a hydrogen fueled internal combustion engine.

The present disclosure is directed to a fuel injector for injecting gaseous fuel in an internal combustion engine. While hydrogen ($H_2$) is used as an example gaseous fuel, the present disclosure should not be limited to hydrogen fuel injectors. The concepts disclosed herein can also apply to other gaseous fuels.

FIG. 1 schematically shows an internal combustion engine 10 that is configured to convert hydrogen fuel into mechanical energy. Engine 10 may include one or more cylinders, one of which is illustrated at 12. Cylinder 12 includes a combustion chamber 14 at least partially defined by cylinder walls 16 and a moveable piston 18.

Combustion chamber 14 is in fluid communication with an air intake manifold 30 via intake valve 32. The air intake manifold can be used to deliver air, including oxygen ($O_2$), to the combustion chamber for combustion. The intake valve can be controlled so that a desired flow of air enters the combustion chamber at a desired time, while at the same time preventing undesired backflow. In some embodiments, engine 10 can include a booster 50, which can be used to increase the pressure of air delivered to the combustion chamber, thereby increasing the relative mass of $O_2$ available for combustion. When present, the booster can include a supercharger and/or a turbocharger.

Engine 10 can include a mechanism for delivering gaseous fuel to the combustion chamber. In the illustrated embodiment, engine 10 includes an electronically-controlled fuel injector 60 positioned for delivering substantially carbon-free fuel directly into the combustion chamber. A fuel injector positioned to inject fuel directly into the combustion chamber can be subjected to a much harsher environment than a port-type fuel injector that injects fuel into the intake manifold. The task of injecting hydrogen fuel into this hostile environment in the short time period allowed by high speed operation often means the injector must operate at high internal pressure (above about 150 bar or 2200 PSI). The direct proximity of the fuel injector to the combustion reaction can lead to high internal fuel injector temperatures. In addition to the harsh environment, fuel injector 60 does not benefit from the lubricating properties of a liquid fuel. To the contrary, fuel injector 60 uses a gaseous fuel, and in the presently described embodiment, hydrogen gas, which can actually reduce lubrication by cleaning the injector.

Engine 10 can include a control system 70 including one or more controllers. In some embodiments, the control system can include a processor 72, input/output ports 74, electronically programmable memory 76, random access memory 78, and/or other components. Control system 70 can be configured to receive various signals from sensors coupled to engine 10 via ports 74. Such received signals can include, but are not limited to: measurements of inducted mass air flow (MAF) from a mass air flow sensor 80; and measurement of manifold pressure (MAP) from a manifold pressure sensor 82. Control system 70 can be used to control intake valve 32, fuel injector 60, booster 50, and/or a variety of other engine components. For example, control system 70 can be used to send injector 60 a pulse-width-modulated signal, which can control the ejection of fuel from the fuel injector.

Engine 10 can also include one or more exhaust gas treatment devices configured to limit undesired tailpipe emissions. For example, engine 10 can include a $NO_x$ trap 90 configured to absorb feedgas $NO_x$. As illustrated, the $NO_x$ trap is downstream of booster 50. In some embodiments, the $NO_x$ trap can be upstream of booster 50. In some embodiments, the $NO_x$ trap can be purged with on-board $H_2$. Additional or alternative exhaust gas treatment devices may be used while remaining within the scope of this disclosure.

FIG. 2 shows electronically controlled fuel injector 60 in more detail. Fuel injector 60 is designed to mitigate the harshness of injecting a gaseous fuel and/or other fuel with poor lubricating properties. Known direct hydrogen fuel injectors are installed into the cylinder head and combustion chamber through a machined clearance and use an o-ring or sleeve-type seal near the tip. Such an arrangement exposes a relatively large portion of the tip to the heat of combustion and insulates the injector body from the surrounding cylinder head, which can be water cooled, thus limiting the ability of the cylinder head to transfer heat away from the injector. As a result, component wear, seizing, galling, leaking, and other unfavorable results often arise under the harsh, non-lubricated conditions. It is believed that such unfavorable conditions can arise in as little as five minutes.

Fuel injector 60 includes a nozzle 102 that includes an opening 120 through which hydrogen can be delivered from the fuel injector. Opening 120 can be sized and shaped to deliver a desired amount of hydrogen at a given pressure when the nozzle is opened for a specific duration. Opening 120 is in fluid communication with a fuel channel 122, through which fuel flows. Fuel channel 122 includes an inlet portion 124 into which hydrogen fuel is received from a fuel rail. The fuel channel includes a cavity portion 126 leading from inlet portion 124 to nozzle opening 120. In some embodiments, a fuel channel can include two or more inlets and/or two or more cavities/fuel paths between the inlet and the nozzle opening. In some embodiments, the nozzle opening may include two or more separate orifices. The hydrogen delivered to the fuel channel can be pressurized, thus encouraging delivery of the hydrogen to the fuel injector and/or injection of the fuel to the cylinder by the injector.

Fuel injector 60 includes a pintle 130 that can be selectively opened and closed. When closed, the pintle at least substantially, if not completely, blocks fluid passage between cavity 126 and opening 120. Thus, the pintle can stop the flow of pressurized fuel out of the injector and into the combustion chamber. On the other hand, when the pintle is opened, pressurized gaseous fuel is introduced from the nozzle directly into the combustion chamber. Pintles can be variously sized and shaped to cooperate with the nozzle to create a selectively open-and-closable opening through which fuel can be ejected. In the illustrated embodiment, pintle 130 is an elongated member that has a tip 132 that is sized and shaped to seal opening 120.

Fuel injector 60 can include a pintle controller, which is configured to selectively move the pintle between the closed position and the opened position. In some embodiments, the pintle controller includes an electromagnet (e.g., a solenoid) that is configured to change an electric and/or magnetic field in response to receiving a control signal. The pintle can respond to the changing electric and/or magnetic field by moving between an opened position and a closed position.

In the embodiment described above, where the pintle is moved in response to a changing electric and/or magnetic field, the signal that is delivered to the pintle controller effectively controls the duration that the nozzle is opened. In some embodiments, a pulse-width-modulated signal is delivered to the controller. The frequency, duty cycle, and/or other attributes of the signal can be selected so that the pintle controller produces the desired electric and/or magnetic field, which in turn causes the pintle to open for a desired duration. For example, a signal having a longer duty cycle can cause the pintle to open for longer than a signal having a shorter duty cycle. A signal having a higher frequency can cause the pintle to open and close more rapidly. The frequency of the pintle can be continuously changed to correspond to changing engine speeds, so that fuel is delivered to the cylinder at desired times, regardless of engine speed.

In some embodiments, the fuel injector can include one or more springs that bias the pintle in one of the opened or closed positions. In the illustrated embodiment, springs 140 bias pintle 130 in a closed position. The relative strength of the spring(s) can affect the opening and closing behavior of the pintle. For example, a stronger spring can cause the pintle to more rapidly move from an opened position to a closed position (or vice versa), which in some embodiments can facilitate precisely controlling the amount of fuel that is ejected.

The alignment of pintle 130 can be important to successfully limiting pressurized gaseous fluid from leaking out of opening 120. If the pintle becomes substantially misaligned, the pressurized gaseous fuel can leak into the combustion chamber, even when the pintle is in the closed position. Furthermore, pintle misalignments can cause premature wear at the pintle tip, which can also contribute to leakage. Such misalignments are not desirable because they make it difficult, if not impossible, to precisely control the amount of fuel available for combustion. Accordingly, the fuel injector can include one or more bearing-type devices, which are configured to direct the pintle as it moves and ensure it properly seals the nozzle opening when in the closed position.

Hydrogen fuel injectors according to the present disclosure can maintain pintle alignment without relying on wear-prone bushings, or other alignment devices that rely on sliding contact with the pintle. Previous designs for hydrogen fuel injectors have used conventional sliding bearing surfaces to support and locate the pintle and armature. This type of bearing can give adequate performance in lubricated applications; however, hydrogen fuel does not provide adequate lubrication to the wear surfaces. Accordingly, alignment devices that do not rely on sliding contact can be used to prolong injector life and/or improve injector performance.

FIG. 3 shows a nonlimiting example of a pintle assembly 150 that can maintain pintle alignment without bushings or other devices that rely on sliding contact with the pintle. Pintle assembly 150 includes pintle 130, mount 152, and supports 154*a* and 154*b*. In this embodiment, the pintle, supports, and mount are manufactured as an integrated unit, although this is not required in all embodiments. The mount can be fixed in the injector and the supports can accurately align the vertical and longitudinal movement of the pintle throughout its range of travel. In other words, as shown in FIG. 4, the supports may pivot and/or flex relative to the mount and/or the pintle, allowing the pintle to move up or down. In the illustrated embodiment, the range of travel is approximately 60 microns. The number, material, length, width, and thickness of the supports are determined by the specific injector requirements. The supports can serve as cantilever springs that bias the pintle in the closed or opened position. Accordingly, the relative springiness of the supports can be selected to provide a desired magnitude of biasing. In some embodiments, another spring, such as coil spring 140, can supplement the biasing of the supports, although this is not required.

In the illustrated embodiment, there are two parallel supports. As such, the supports benefit from a parallelogram effect that maintains the pintle parallel relative to the mount. In the illustrated embodiment, the pintle is supported from only one side, and therefore the pintle may slightly arc as it travels up or down.

In some embodiments, a support may be substantially linear. In other embodiments, a support may have a nonlinear shape. In either case, the support can be configured to flex and change shape throughout the length of the support, or the support can be configured so that most of the flex occurs at a limited segment of the support. As a nonlimiting example, a joint between the pintle and the support and/or a joint between the support and the mount can be configured to provide most of the flex, while the middle portion of the support remains substantially fixed. For example, in some embodiments, the support may be inflexible, and the joints may be hinged to allow for all vertical movement of the pintle. In such cases, an external spring, such as a coil spring, can be used to bias the pintle. As another example, the joints can be relatively rigid so that most of the flex occurs throughout a middle portion of the support. As yet another example, some of the flex can occur at the joints while some of the flex occurs throughout a middle portion of the support.

In some embodiments, the supports can be angled slightly downward when the pintle is in the closed position. In this way, the supports need only be angled slightly upward when the pintle is fully opened. Thus, the amount the supports angle past a central position can be limited, and the horizontal displacement of the pintle as it is opened and closed is reduced.

FIG. 5 shows another embodiment of a pintle assembly 160. Pintle assembly 160 includes a pintle 162, a top mount 164 and top supports 166. The pintle assembly also includes a bottom mount 168 and bottom supports 170. As discussed above with respect to pintle assembly 150, pintle assembly 160 includes support pairs that benefit from a parallelogram effect that can help maintain the pintle in a parallel relationship relative the mounts. As an example, supports 166 and 170 are maintained substantially parallel to one another, and therefore the pintle remains parallel to a line intersecting the joint of the top mount with support 166 and the joint of the bottom mount with support 168. In this way, pintle alignment is enhanced.

Pintle assembly 150 and pintle assembly 160 are both configured to maintain pintle alignment independent of any sliding contact with a bushing or bearing surface, although supplemental sliding contact can optionally be used in some embodiments. Other pintle assemblies having different configurations can also be used without departing from the spirit of this disclosure. As nonlimiting examples, other arrangements that utilize cantilevered springs and/or parallelogram arrangements can be used to maintain pintle alignment and provide for pintle travel.

The invention claimed is:

1. A fuel injector, comprising:
   a fuel channel configured to receive pressurized gaseous fuel from a fuel rail;
   a nozzle in fluid communication with the fuel channel;
   a pintle having an opened position and a closed position, wherein pressurized gaseous fuel is delivered from the nozzle when the pintle is in the opened position and wherein delivery of the pressurized gaseous fuel is substantially blocked when the pintle is in the closed position;
   at least one cantilever support to align the pintle with the nozzle and bias the pintle in the closed position; and
   a pintle controller configured to selectively move the pintle between the closed position and the opened position.

2. The fuel injector of claim 1, where the at least one cantilever support is one of a plurality of cantilever supports, and where each cantilever support is mounted parallel to at least one other cantilever support.

3. The fuel injector of claim 2, where each of the plurality of cantilever supports is a cantilever spring.

4. The fuel injector of claim 2, where the plurality of cantilever supports includes a top set of supports radially extending from the pintle.

5. The fuel injector of claim 4, where the plurality of cantilever supports includes a bottom set of supports radially extending from the pintle.

6. The fuel injector of claim 2, where each of the plurality of cantilever supports extends substantially perpendicular away from the pintle.

7. The fuel injector of claim 1, wherein the pintle controller includes an electronically controlled solenoid.

8. A fuel injector, comprising:
   a fuel channel configured to receive pressurized gaseous fuel from a fuel rail;
   a nozzle in fluid communication with the fuel channel;
   a pintle having an opened position and a closed position, wherein pressurized gaseous fuel is delivered from the nozzle when the pintle is in the opened position and wherein delivery of the pressurized gaseous fuel is substantially blocked when the pintle is in the closed position;
   a parallelogram support assembly to align the pintle with the nozzle, the parallelogram support assembly including at least two parallel, cantilever-spring, support members laterally extending from the pintle; and
   a pintle controller configured to selectively move the pintle between the closed position and the opened position.

9. The fuel injector of claim 8, wherein the pintle controller includes an electronically controlled solenoid.

10. A fuel injector, comprising:
    a fuel channel configured to receive pressurized gaseous fuel from a fuel rail;
    a nozzle in fluid communication with the fuel channel;
    a pintle having an opened position and a closed position, wherein pressurized gaseous fuel is delivered from the nozzle when the pintle is in the opened position and wherein delivery of the pressurized gaseous fuel is substantially blocked when the pintle is in the closed position;
    at least one support laterally extending from the pintle to a mount, the support aligning the pintle with the nozzle and biasing the pintle in the closed position; and
    a pintle controller configured to selectively move the pintle between the closed position and the opened position.

11. The fuel injector of claim 10, where the support is one of a plurality of supports, and where each support is mounted parallel to at least one other support.

12. The fuel injector of claim 11, where each of the plurality of supports is a cantilever spring.

13. The fuel injector of claim 11, where the plurality of supports includes a top set of supports radially extending from the pintle.

14. The fuel injector of claim 13, where the plurality of supports includes a bottom set of supports radially extending from the pintle.

15. The fuel injector of claim 11, where each of the plurality of supports extends substantially perpendicular away from the pintle.

16. The fuel injector of claim 10, wherein the pintle controller includes an electronically controlled solenoid.

* * * * *